US00RE43013E

(19) United States
(12) Reissued Patent
Balko

(10) Patent Number: US RE43,013 E
(45) Date of Reissued Patent: Dec. 13, 2011

(54) CIGARETTE HOLDING AND DISPENSING APPARATUS

(76) Inventor: Alexander Balko, Gastonia, NC (US)

(21) Appl. No.: 12/265,858

(22) Filed: Nov. 6, 2008

Related U.S. Patent Documents

Reissue of:
(64) Patent No.: 7,207,463
Issued: Apr. 24, 2007
Appl. No.: 10/777,855
Filed: Feb. 13, 2004

(51) Int. Cl.
*A24F 15/14* (2006.01)
*G07F 11/22* (2006.01)

(52) U.S. Cl. ..... 221/249; 221/248; 221/247; 221/138; 221/260

(58) Field of Classification Search ..... 221/136, 221/244, 247, 248, 249, 260
See application file for complete search history.

(56) References Cited

U.S. PATENT DOCUMENTS 2,419,409 A * 4/1947 Long ..... 221/148
2,970,721 A * 2/1961 Fontana ..... 221/227
4,120,423 A 10/1978 Fruhwirth
5,086,918 A 2/1992 D'anotonio
5,265,717 A 11/1993 Daghestani
5,503,268 A 4/1996 Pham
5,726,421 A 3/1998 Fleischhauer et al.

* cited by examiner

*Primary Examiner* — Timothy Waggoner
(74) *Attorney, Agent, or Firm* — Ashley Law Firm P.C.; Stephen S. Ashley, Jr.

(57) ABSTRACT

A cigarette holding and dispensing apparatus includes a housing having a first and second dividing wall therein such that first, second and third compartment are defined within the housing. The first dividing wall has a vertical slot therein and into the first and third compartments. A covering is removably positioned on the housing. The covering has an aperture therein extending into the third compartment and an opening extending into said second compartment. A lighter may be positioned in the second compartment and a plurality of cigarettes may be positioned in the third compartment. An actuating assembly is mounted in the first compartment and extends into the third compartment through the first vertical slot for selectively lifting a cigarette upwardly through the aperture in the covering.

18 Claims, 8 Drawing Sheets

CIGARETTE HOLDING AND DISPENSING APPARATUS

Matter enclosed in heavy brackets [ ] appears in the original patent but forms no part of this reissue specification; matter printed in italics indicates the additions made by reissue.

*This application is a reissue of application Ser. No. 10/777,855, now U.S. Pat. No. 7,207,463, which is incorporated herein by reference.*

BACKGROUND OF THE INVENTION

1. Field of the Invention

The present invention relates to cigarette holding devices and more particularly pertains to a new cigarette holding device for holding and dispensing a plurality of cigarettes.

2. Description of the Prior Art

The use of cigarette holding devices is known in the prior art. U.S. Pat. No. 5,086,918 describes a device that includes a lever positioned on a fulcrum for pushing a cigarette out of a housing. Another type of cigarette holding device is U.S. Pat. No. 5,503,268 having a sleeve positioned within a housing wherein the each of the sleeve and housing having alignable apertures therein for the dispensing of cigarettes. Yet another cigarette holding device is shown in U.S. Pat. No. 5,265,717 which includes a mechanism for holding cigarettes and lighting such before finally dispensing the lighted cigarette.

While these devices fulfill their respective, particular objectives and requirements, the need remains for a device that efficiently holds and dispenses cigarettes. A dispensing assembly for the device should be inexpensive in its construction and preferably devoid of mechanical couplers which are prone to failure. It is also preferred that the device includes a compartment for holding a cigarette lighter.

SUMMARY OF THE INVENTION

The present invention meets the needs presented above by providing a housing for protecting a plurality of cigarettes. Within the housing is an actuating assembly comprised of a single piece of plastic which is adapted to open an aperture for accessing the cigarettes and for lifting one of the cigarettes upwardly through the aperture. The single piece construction allows the actuating assembly to be molded from plastic in a single step and removes any inner couplers which may fail over time and render the actuating assembly ineffective.

Another object of the present invention is to provide a new cigarette holding device that includes a compartment for holding a cigarette lighter such that an actuator of the cigarette lighter is exposed for usage.

To this end, the present invention generally comprises a housing having a bottom wall, a front wall, a back wall, a first side wall and a second side wall. A first dividing wall extends from the first side wall to the second side wall. A second dividing wall extends between the first dividing wall and the front wall. A first compartment is defined between the first dividing wall and the back wall. A second compartment is defined between the second dividing wall and the first side wall and a third compartment is defined between the second dividing wall and the second wall. The first dividing wall has a vertical slot therein extending upwardly from the bottom wall and into the first and third compartments. A covering is positioned on the housing and extends over the first and third compartments. The covering has an aperture therein extending into the third compartment and an opening extending through the cover extends into the second compartment. A lighter may be positioned in the second compartment and a plurality of cigarettes may be positioned in the third compartment. An actuating assembly is mounted in the first compartment and extends into the third compartment through the first vertical slot for selectively lifting a cigarette upwardly through the aperture in the covering.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
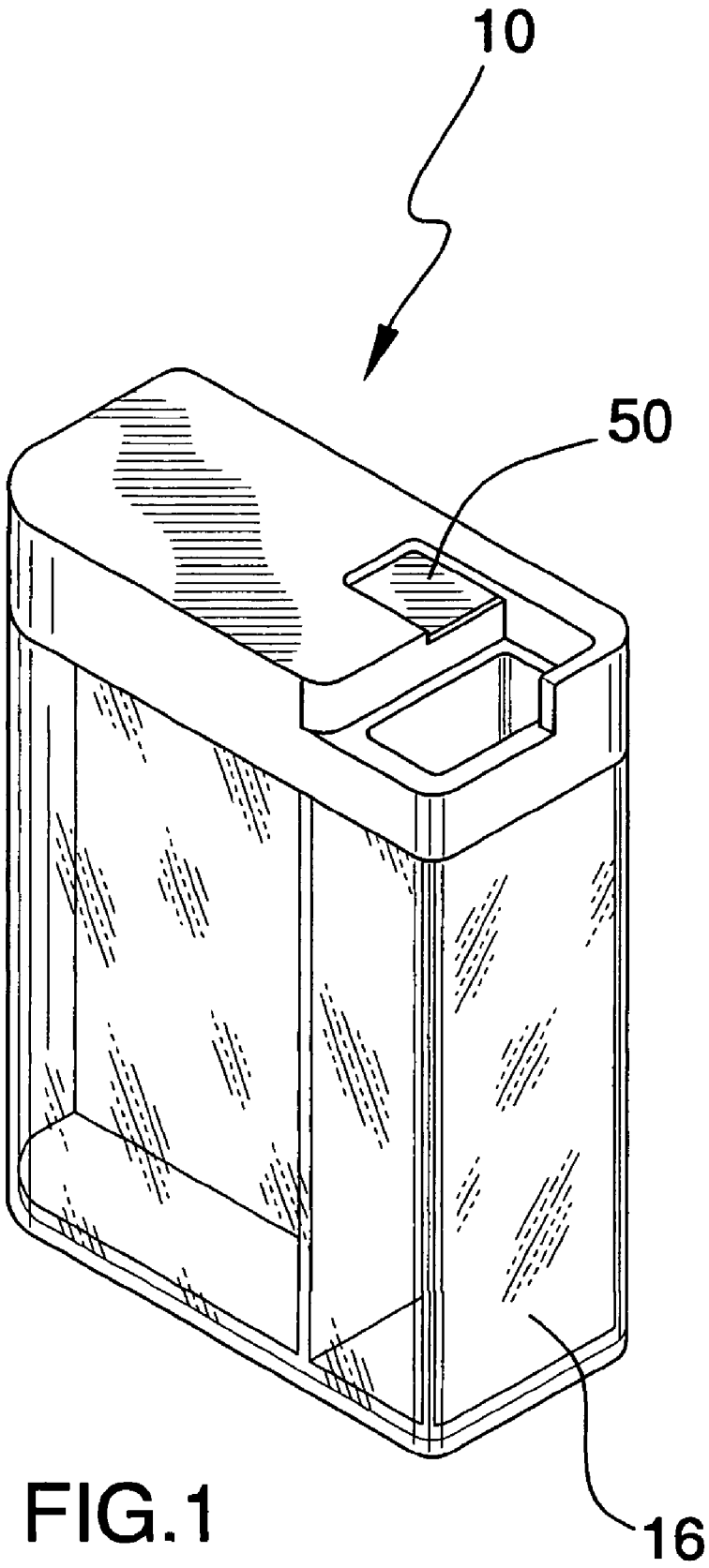
FIG. 1 is a schematic perspective view of a cigarette holding and dispensing apparatus according to the present invention.
Figure 2:
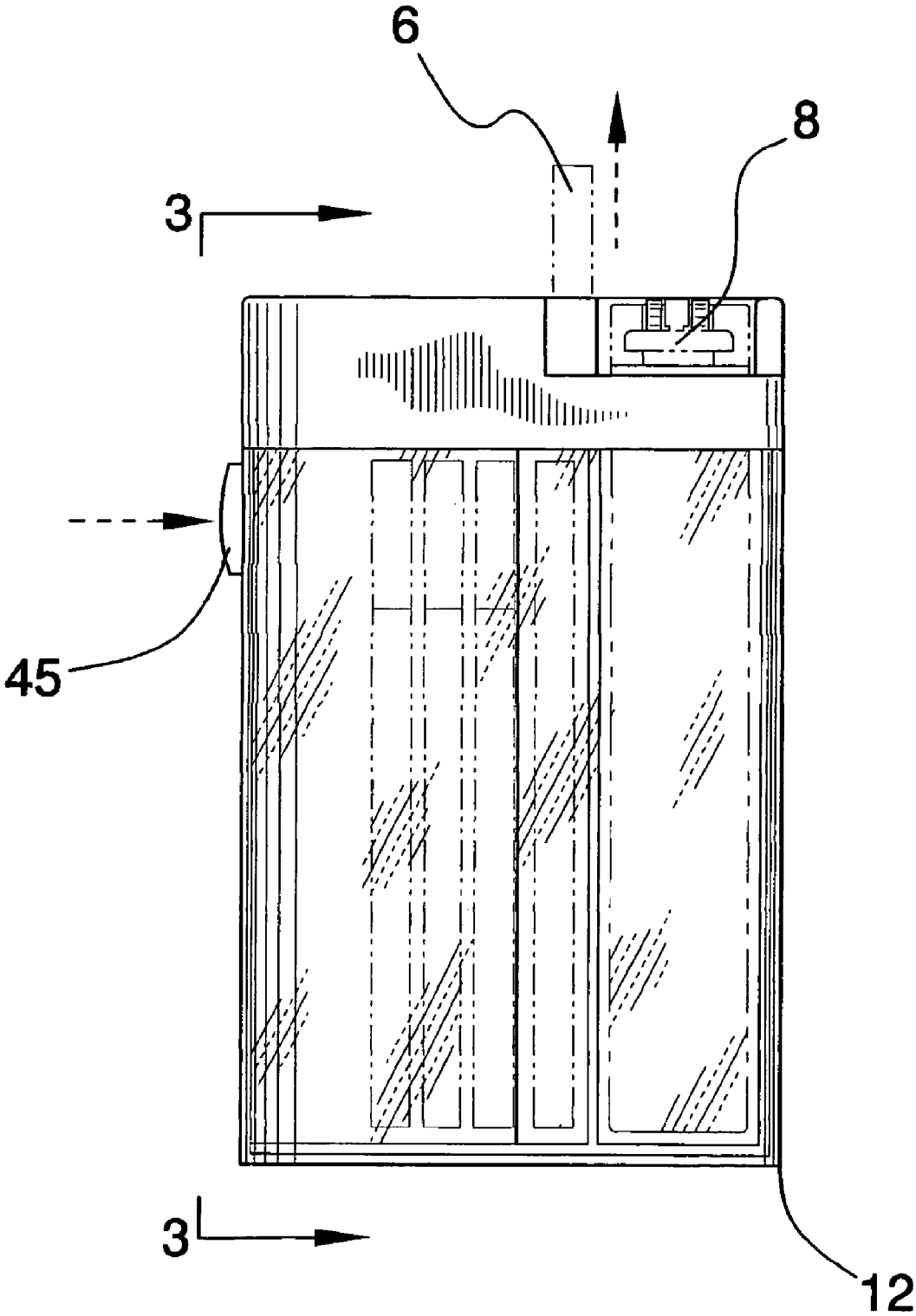
FIG. 2 is a schematic front view of the present invention.
Figure 3:
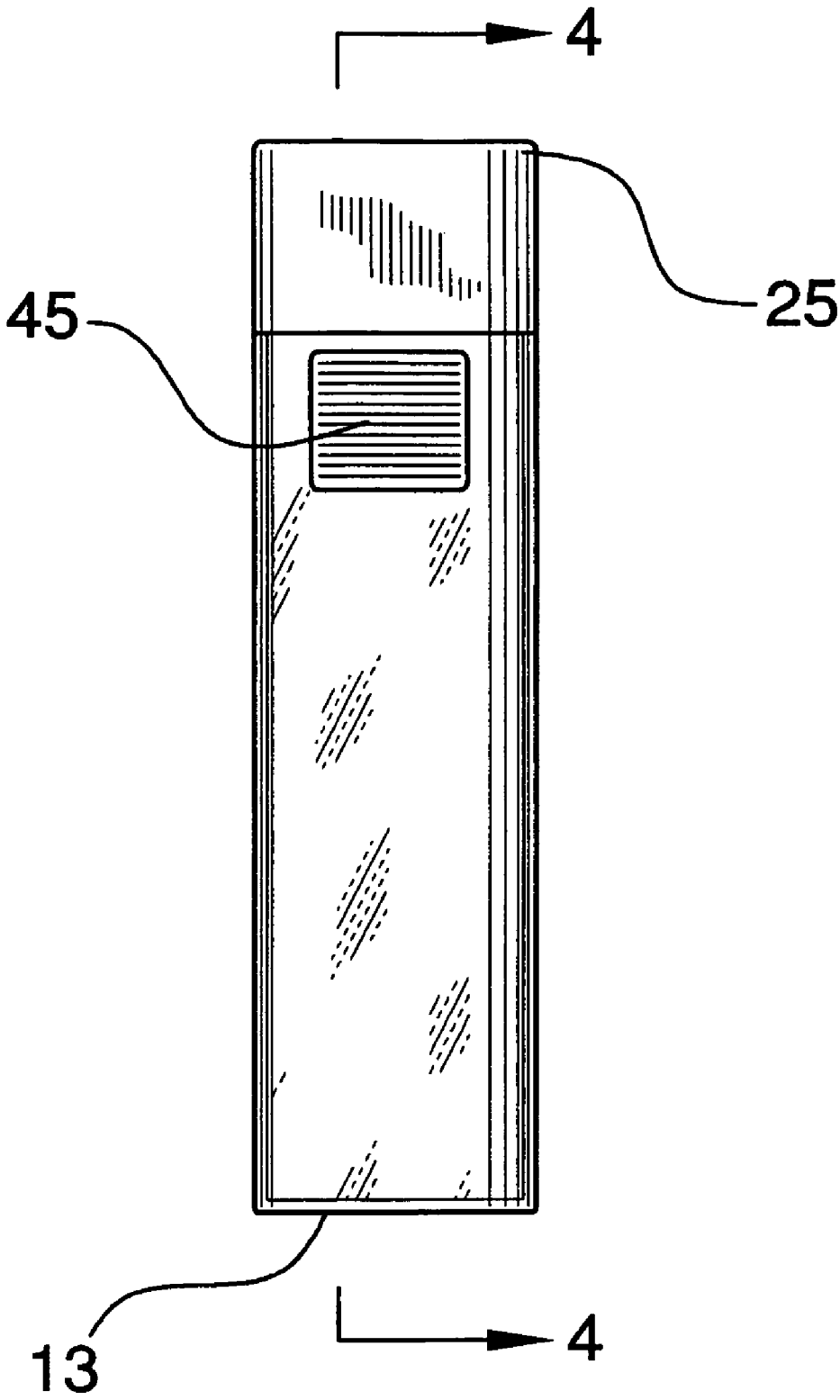
FIG. 3 is a schematic right side view of the present invention.
Figure 4:
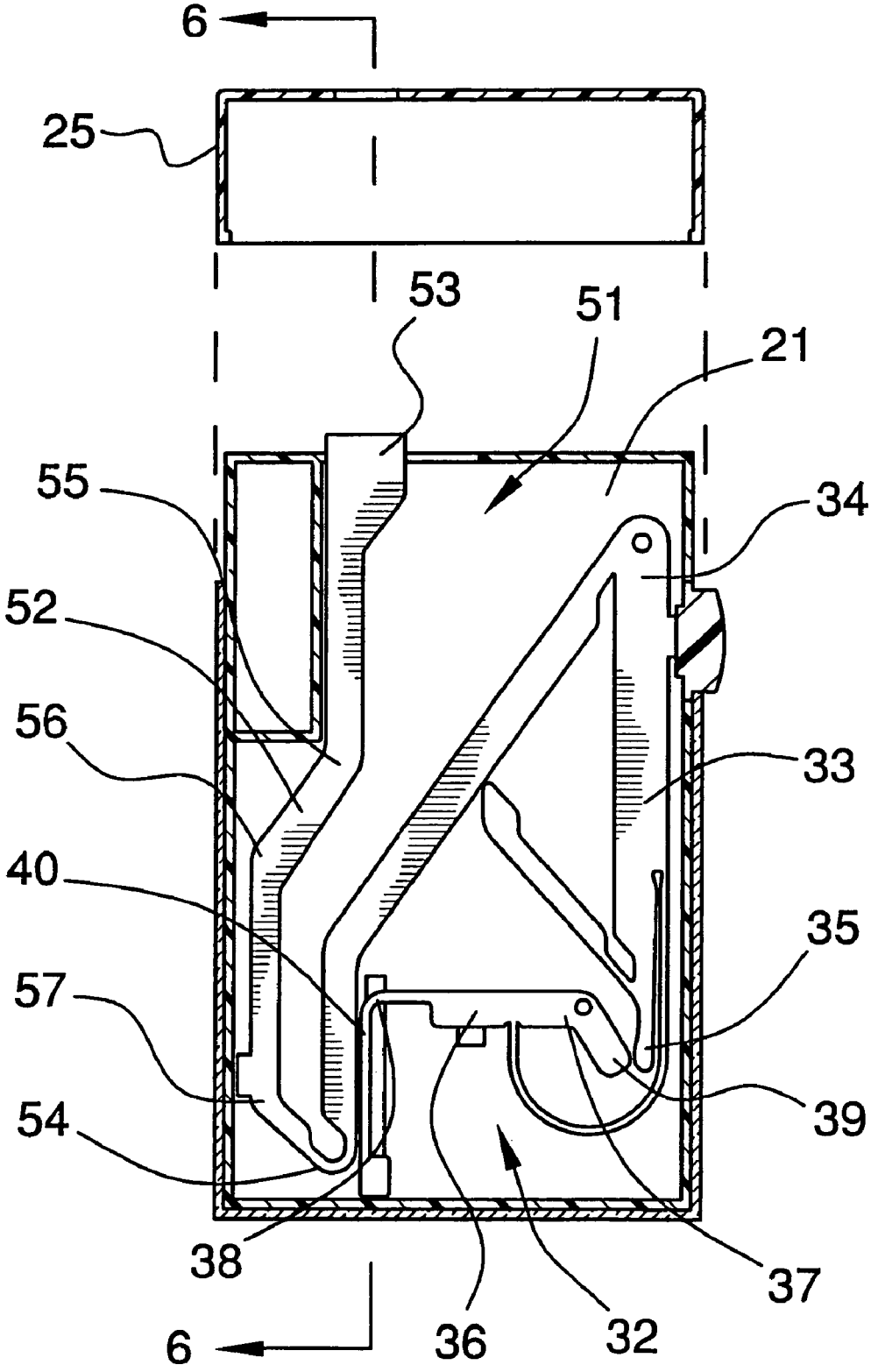
FIG. 4 is a schematic cross-sectional view taken along line 4—4 of FIG. 3 of the present invention.
Figure 5:
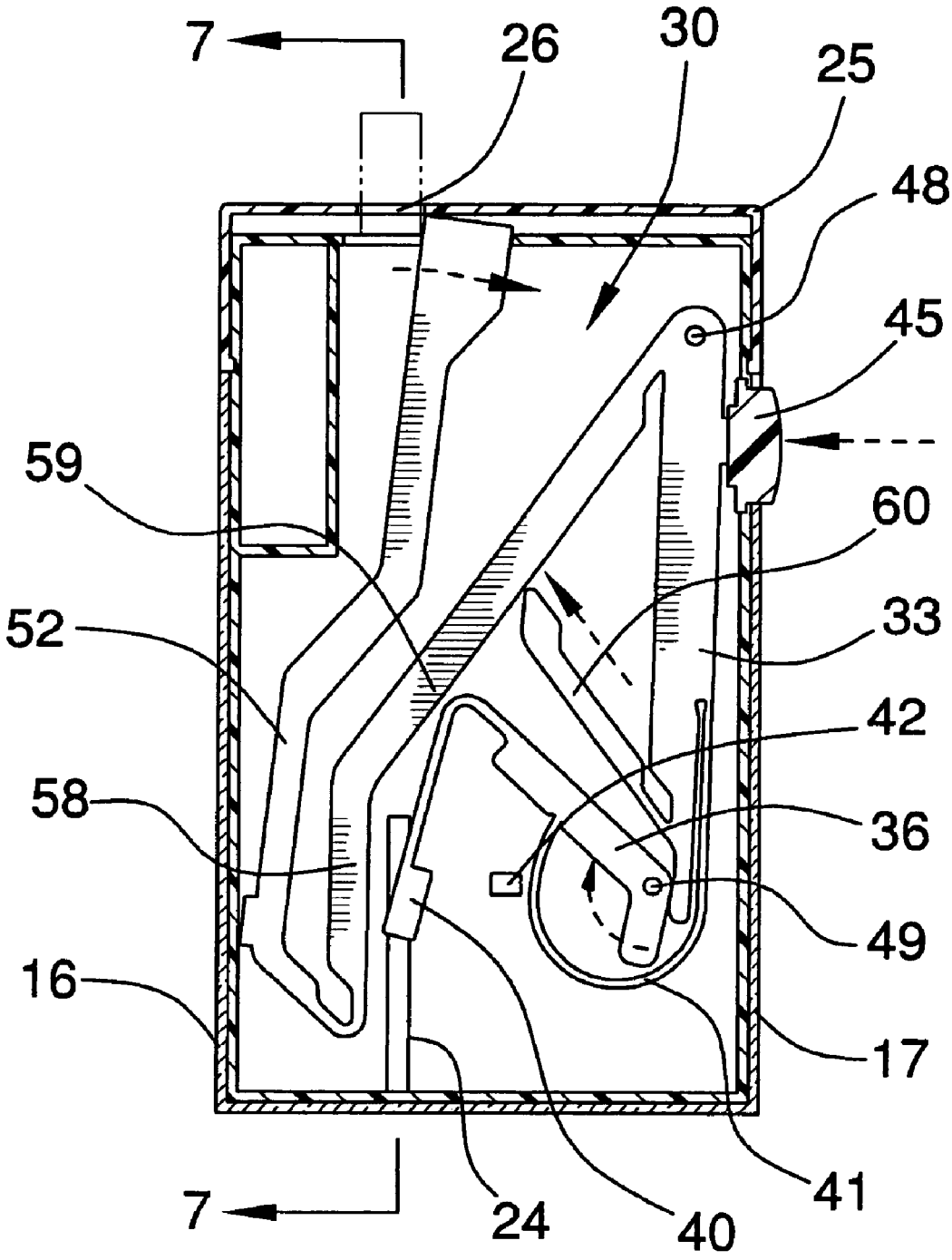
FIG. 5 is a schematic cross-sectional view taken along line 4—4 of the present invention and showing the movement of the actuating assembly.
Figure 6:
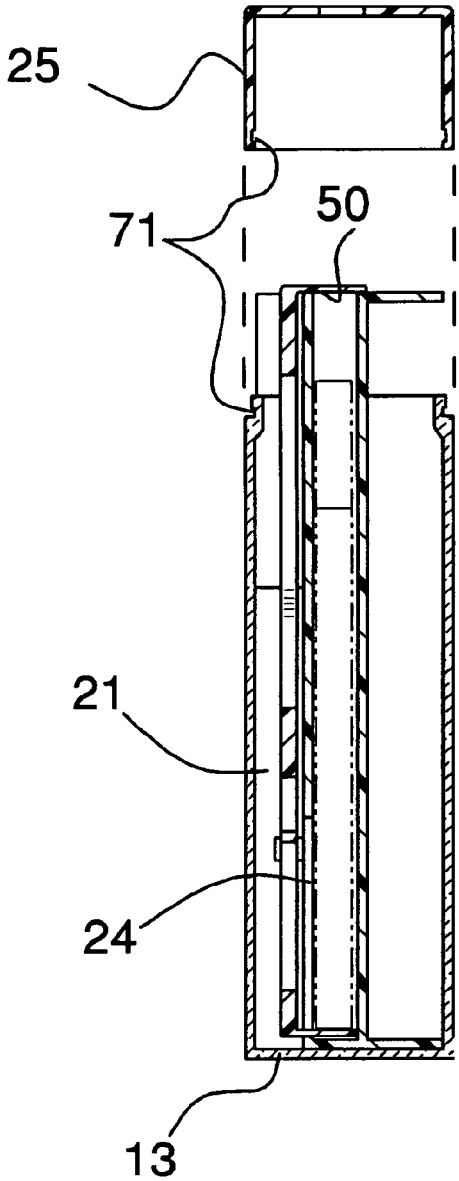
FIG. 6 is a schematic cross-sectional view taken along line 6—6 of FIG. 4 of the present invention.
Figure 7:
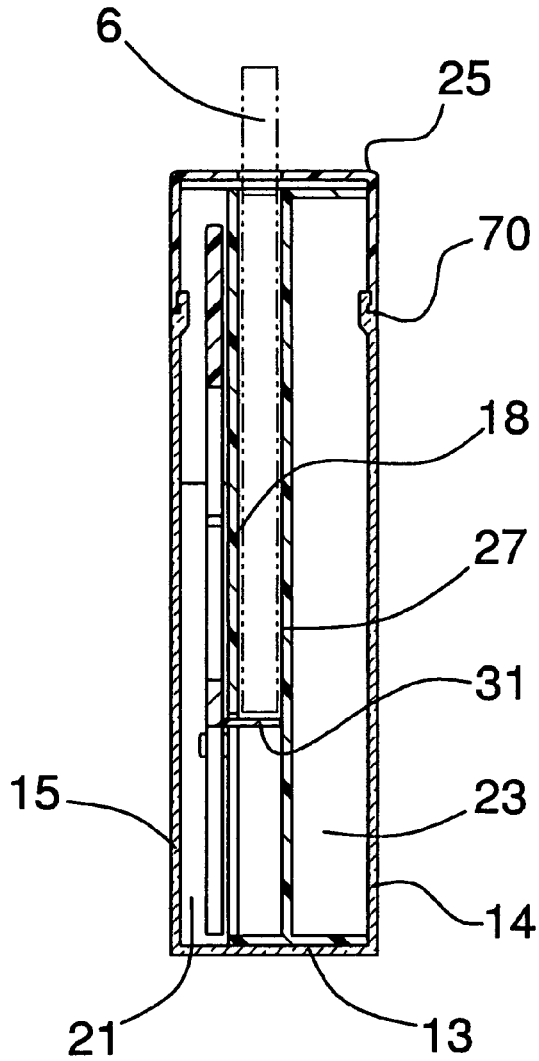
FIG. 7 is a schematic cross-sectional view taken along line 7—7 of FIG. 5 of the present invention.
Figure 8:
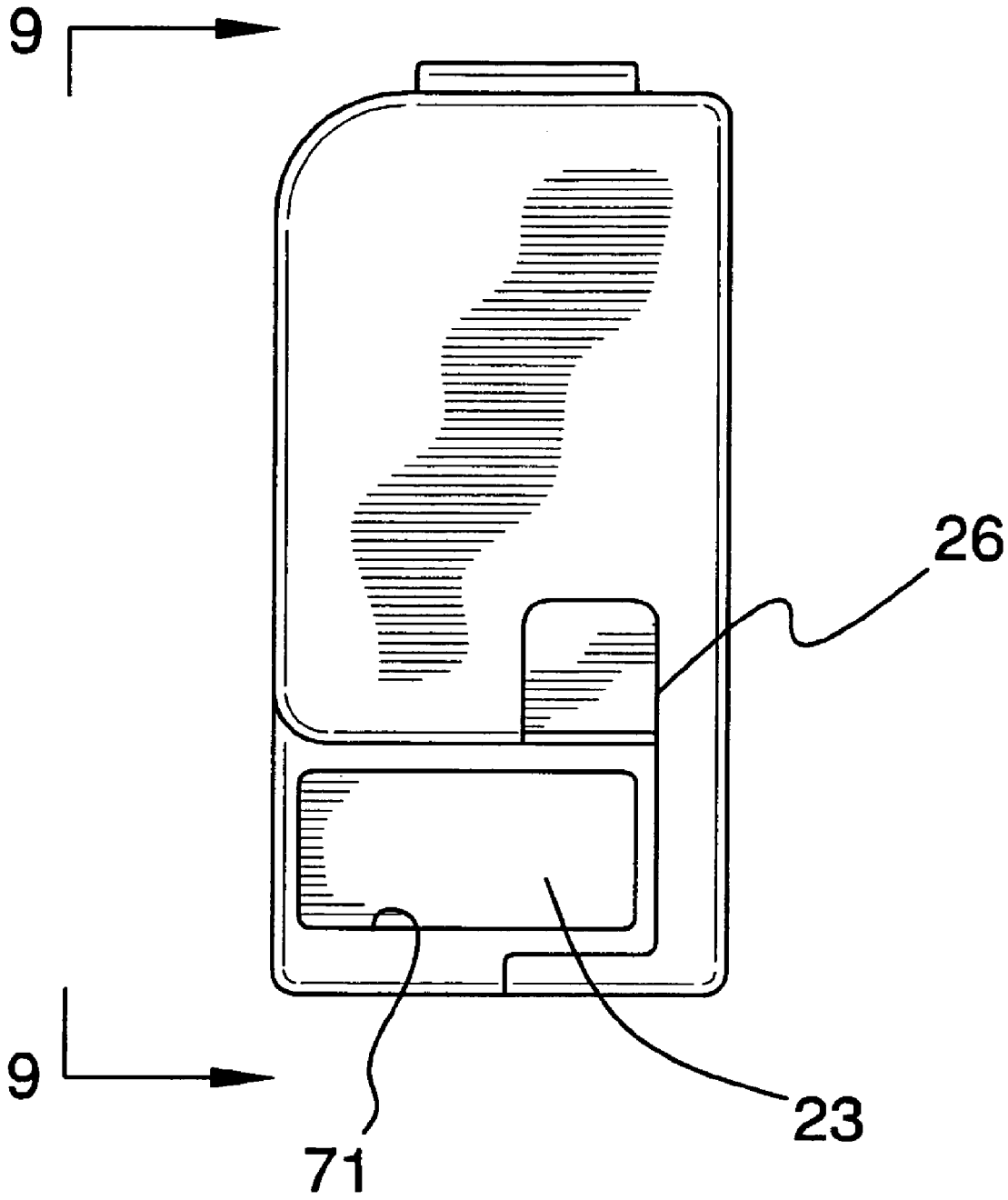
FIG. 8 is a schematic top view of the present invention.

With reference now to the drawings, and in particular to FIGS. 1 through 9 thereof, a new cigarette holding device embodying the principles and concepts of the present invention and generally designated by the reference numeral 10 will be described.

Figure 9:
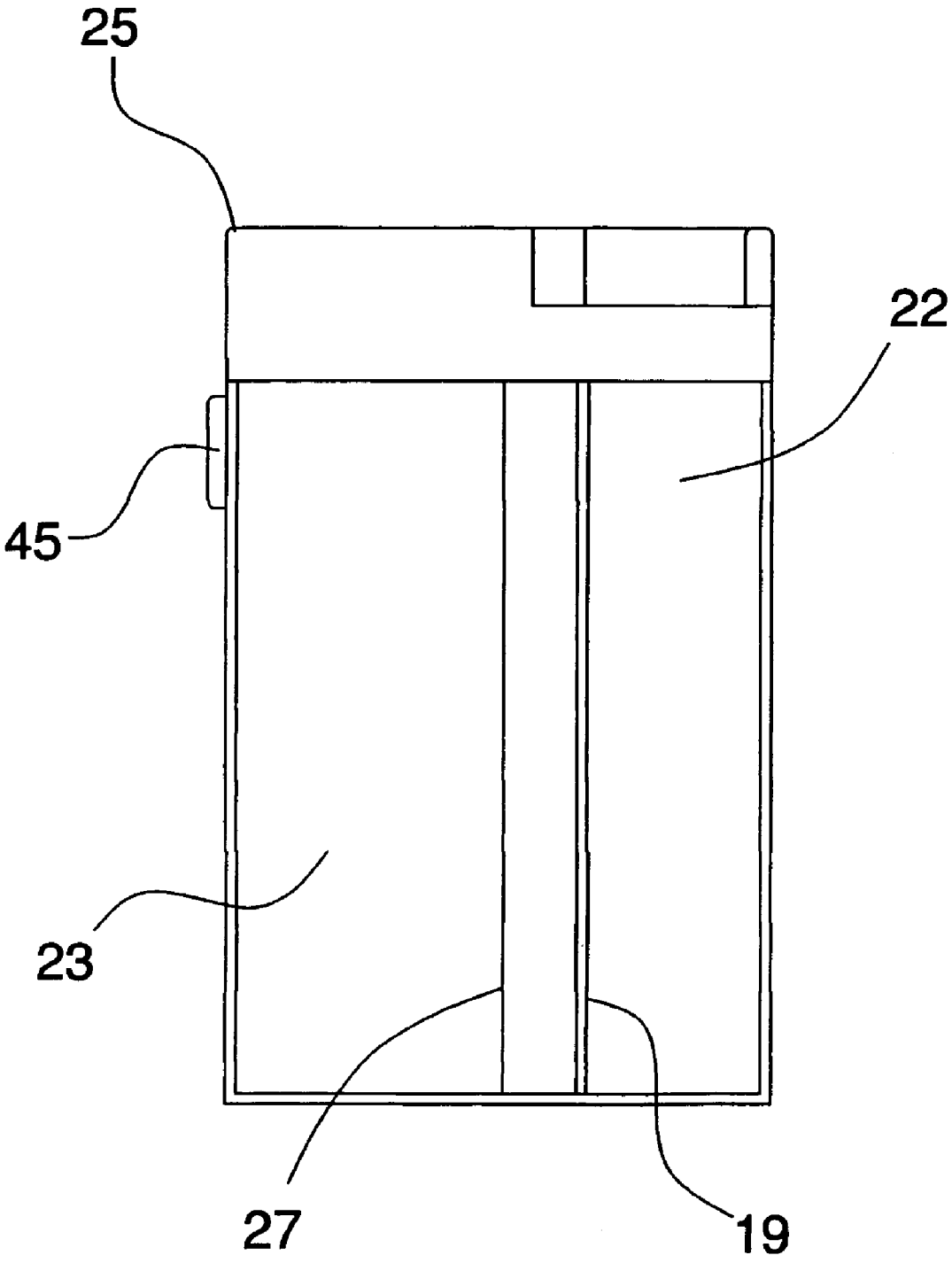
FIG. 9 is a schematic front view of the present invention having the front wall removed.

As best illustrated in FIGS. 1 through 9, the cigarette holding and dispensing apparatus 10 generally comprises a housing 12 having a bottom wall 13, a front wall 14, a back wall 15, a first side wall 16 and a second side wall 17. A first dividing wall 18 extends from the first side wall 16 to the second side wall 17. A second dividing wall 19 extends between the first dividing 18 wall and the front wall 14. The second dividing wall 19 is positioned nearer the first side wall 16 than the second side wall 17. A first compartment 21 is defined between the first dividing wall 18 and the back wall 15, a second compartment 22 is defined between the second dividing wall 19 and the first side wall 16 and a third compartment 23 is defined between the second dividing wall 19 and the second side wall 17. FIG. 9 is shown without the front wall to better view the dividing wall 19 and the second 22 and third 23 compartments. The first dividing wall 18 has a vertical slot 24 therein extending upwardly from the bottom wall 13 and into the first 21 and third 23 compartments. The vertical slot 24 is positioned adjacent to the second dividing wall 19. A covering 25 is removably positioned on the housing for selectively opening or closing the housing 25. Interlocking shoulders 70 removably secure the covering 25 to the housing 12. The housing has an opening extending therethrough and into the second compartment 22. The covering 25 is spaced from the first dividing wall 18. An aperture 26 extends through the covering 25 and into the third compartment 23. The aperture 26 is positioned adjacent to the second dividing wall 19. A vertical guide wall 27 is positioned in the third compartment 23 and attached to the second dividing wall 19. The vertical guide wall 27 is positioned between the first dividing wall 18 and the front wall 14.

An actuating assembly 30 is mounted in the first compartment 21 and extends into the third compartment 23 for selectively lifting a cigarette upwardly through the aperture 26 in the covering 25. The actuating assembly 30 includes a lifting plate 31 positioned in the third compartment 23 and positioned adjacent to the vertical slot 24. A lifting arm 32 is positioned in the first compartment 21, extends through the slot 24 and is attached to the lifting plate 31. The lifting arm 32 includes a vertically orientated first arm 33 having an upper end 34 and a lower end 35. The upper end 34 is pivotally coupled to the first dividing wall 18 by a pivot member 48 and is positioned adjacent to the second side wall 17. A horizontally orientated second arm 36 has a first end 37 and a second end 38. The first end 37 of the second arm 36 is pivotally attached to the first dividing wall 18 by a pivot member 49 and is positioned adjacent to the lower end 35 of the first arm 33. A foot 39 is integrally attached to and extends downwardly and away from the first end 37 of the second arm 36. The foot 39 extends toward the second side wall 17 so that it is angled with respect to the second arm 36. The second end 38 of the second arm 36 is positioned adjacent to an upper end of the slot 24. A leg 40 is attached to the second end 38 of the second arm 36 and extends downwardly therefrom. A bottom end of the leg 40 is integrally attached to the plate 31. A biasing member 41 is U-shaped and has a first end attached to the first arm 33 and a second end attached to the second arm 36 so that the biasing member 41 forms a cup having the foot 39 and lower end 35 of the first arm 33 therein and positioned adjacent to the bottom wall 13. A stop 42 is attached to the first dividing wall 18 and positioned adjacent to the second arm 36 and between the second arm 36 and the bottom wall 13. The stop 42 prevents the second arm 36 from moving below horizontal and toward the bottom wall 13.

An actuator 45 is integrally coupled to the lifting arm 32 for selectively moving the lifting plate 31 upwardly such that a cigarette 6 positioned on the lifting plate 32 will be extended upwardly through the aperture 26. The actuator 45 extends through the second side wall 17 and is attached to the first arm 33. The actuator 45 is positioned nearer the upper end 34 than the lower end 35 of the first arm 33. When the actuator 45 is depressed, the lower end 35 forces the foot 39 downward. The biasing member 41 pulls down the second arm 36 back to a horizontal position. When the second arm 36 is rotated, the leg 40 is lifted and with it a cigarette 6 positioned thereon so that the cigarette 6 extends upwardly through the aperture 26.

A panel 50 is positioned between the covering 25 and the first dividing wall 27. An opening arm 51 is attached to the panel 50 for selectively moving the panel 50 from a first position closing the aperture 26 to a second position opening the aperture 26 and allowing the cigarette 6 to pass therethrough. The opening arm 51 is positioned in the first compartment 21 and is integrally coupled to the actuator 45 such that the opening arm 51 moves the panel 50 to the second position when the lifting arm 32 moves the plate 31 upwardly. The opening arm 51 includes a first elongated member 52 having first end 53 integrally attached to the panel 50 and a second end 54 positioned adjacent to said bottom wall 13. The first elongated member 52 has first bend 55, a second bend 56 and a third bend 57. Each of the first 55, second 56 and third 57 bends have generally the same angle such that the first elongated member 52 extends downwardly from the covering 25 to the first bend 55, extends downward and toward the first side wall 16 to the second bend 56, downward along the first side wall 16 to the third bend 57 and then downward and toward the second side wall 17. The second end 56 of the first elongated member 52 is positioned adjacent to the slot 24 and positioned between the slot 24 and the first side wall 16. A second elongated member 58 is integrally attached to and extends upwardly from the second end 54 of the first elongated member 52. A third elongated member 59 is integrally attached to and extends between a top end of the second elongated member 58 and the upper end 34 of the first arm 33 such that the third elongated member 59 is angled upwardly from second elongated member 58 to the first arm 33. A biasing arm 60 is integrally attached to the first arm 33 and extends toward and abuts the third elongated member 59. The biasing arm 60 is angled upwardly such that the biasing arm 60 and the third elongated member 59 form an angle directed toward the first arm 33 that has a measurement greater than 90 degrees.

When the actuator 45 is depressed, an end of the third elongated member 59 attached to the second elongated member 58 is moved upwardly. This movement is aided by the biasing arm 60 which moves against and slides up the third elongated movement 59. As the third elongated member 59 moves in this way, the second elongated member 58 moves the third bend 57 upwardly on the second end wall 17 and the top end of the second elongated member 58 moves toward the first elongated member 52. The bending between the first 52 and second 58 elongated members causes the first end 53 of the first elongated member 52 to move toward the second side wall 17 and bring the panel 50 with it so that the aperture 26 is opened. Since the lifting plate 31 is being moved upwardly at the same time, the panel 50 is only opened while a cigarette 6 is moving upwardly to and then through the aperture 26. When the actuator 45 is released, the biasing member 41 attempts to straighten and in doing so pulls the second arm down 36 and pulls the first arm 33 toward the second side wall 17. This rotates the third elongated member 59 back to its original position which again places the panel 50 in the closed position.

In use, a plurality of cigarettes 6 is positioned in the third compartment 23 by removing the covering 25 and positioning the cigarettes in the third compartment 23. The housing 12 is held at an angle so that one of the cigarettes 6 is positioned between the first dividing wall 18 and the guide wall 27 and on top of the plate 31. When the actuator 45 is depressed, the panel 50 is moved away from the aperture 26 and the plate 31 lifts the cigarette 6 upwardly through the aperture 26 so that the user of the apparatus 10 may grasp it. A lighter 8 may be positioned in the second compartment 22 by extending it through the opening 71 and so that an upper end of the lighter 8 is exposed for use. In this position, the lighter 8 may used to light the cigarette 6. The housing 12 protects the cigarettes 6 and provides a convenient place for the lighter 8. It is an advantage of the actuating assembly 30 that it be constructed from one piece of molded plastic. The plastic is resiliently flexible and allows the apparatus 10 to lift a cigarette 6 and open the aperture 26 simultaneously without any mechanical connections between the various components of the actuating assembly 10. This feature reduces cost of manufacture while also reducing the risk of operation failure.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cigarette dispensing and lighter holding combination device comprising:

a housing having a bottom wall, a front wall, a back wall, a first side wall and a second side wall, a first dividing wall extending from said first side wall to said second side wall, a second dividing wall extending between said first dividing wall and said front wall, a first compartment being defined between said first dividing wall and said back wall, a second compartment being defined between said second dividing wall and said first side wall and a third compartment being defined between said second dividing wall and said second side wall, said first dividing wall having a vertical slot therein extending upwardly from said bottom wall and into said first and third compartments, a covering being removably positioned on said housing, said covering having an aperture therein extending into said third compartment and an opening therein extending into said second compartment, wherein a lighter may be positioned in said second compartment and a plurality of cigarettes may be positioned in the third compartment; and an actuating assembly being mounted in said first compartment and extending into said third compartment through said first vertical slot for selectively lifting a cigarette upwardly through said aperture in said covering.

2. The device according to claim 1, wherein said actuating assembly includes:

a lifting plate positioned in said third compartment and positioned adjacent to said vertical slot;

a lifting arm being attached to said lifting plate; and an actuator being integrally coupled to said lifting arm for selectively moving said lifting plate upwardly such that a cigarette positioned on said lifting plate is extended upwardly through said aperture, said actuator extending through said second side wall.

3. The device according to claim 2, wherein said vertical slot is positioned adjacent to said second dividing wall.

4. The device according to claim 2, further including a panel being positioned between said covering and said first dividing wall, an opening arm being attached to said panel for selectively moving said panel from a first position closing said aperture to a second position opening said aperture, said opening arm being integrally coupled to said actuator such that said opening arm moves said panel to said second position when said lifting arm moves said plate upwardly.

5. A cigarette dispensing and lighter holding combination device comprising:

a housing having a bottom wall, a front wall, a back wall, a first side wall and a second side wall, a first dividing wall extending from said first side wall to said second side wall, a second dividing wall extending between said first dividing wall and said front wall, said second dividing wall being positioned nearer said first side wall than said second side wall, a first compartment being defined between said first dividing wall and said back wall, a second compartment being defined between said second dividing wall and said first side wall and a third compartment being defined between said second dividing wall and said second side wall, said first dividing wall having a vertical slot therein extending upwardly from said bottom wall and into said first and third compartments, said vertical slot being positioned adjacent to said second dividing wall, a covering being removably positioned on said housing, said covering being spaced from said first dividing wall, said covering having an aperture therein, said aperture extending into said third compartment and being positioned adjacent to said second dividing wall, said covering having an opening extending therethrough and into said second compartment, wherein a lighter may be positioned in said second compartment and a plurality;

an actuating assembly being mounted in said first compartment and extending into said third compartment for selectively lifting a cigarette upwardly through said aperture in said covering, said actuating assembly including;

a lifting plate positioned in said third compartment and positioned adjacent to said vertical slot;

a lifting arm being positioned in said first compartment, said lifting arm extending through said slot and being attached to said lifting plate;

an actuator being integrally coupled to said lifting arm for selectively moving said lifting plate upwardly such that a cigarette positioned on said lifting plate is extended upwardly through said aperture, said actuator extending through said second side wall;

a panel being positioned between said covering and said first dividing wall;

an opening arm being attached to said panel for selectively moving said panel from a first position closing said aperture to a second position opening said aperture, said opening arm being integrally coupled to said actuator such that said opening arm moves said panel to said second position when said lifting arm moves said plate upwardly.

6. The device according to claim 5, wherein said lifting arm includes a vertically orientated first arm having an upper end and a lower end, said upper end of said first arm is pivotally coupled to said first dividing wall and positioned adjacent to said second side wall, a horizontally orientated second arm includes a first end and a second end, said first end of said second arm is pivotally attached to said first dividing wall and positioned adjacent to said lower end of said first arm, a foot being integrally attached to and extending downwardly and away from said first end of said second arm, said foot extending toward said second side wall, said second end of said second arm being positioned adjacent to an upper end of said slot, a leg being attached to said second end of said second arm and extending downwardly therefrom, a bottom end of said leg being integrally attached to said plate, said actuator extending through the second side wall and being attached to said first arm, wherein depressing said actuator forces said foot downward such that said leg and the attached plate is lifted.

7. The device according to claim 6, further including a biasing member, said biasing member being U-shaped and having a first end attached to the first arm and a second end attached to the second arm, said biasing member biasing said second arm toward a horizontal position.

8. The device according to claim 6, wherein said opening arm includes a first elongated member having first end integrally attached to said panel and a second end positioned adjacent to said bottom wall, said first elongated member having first bend, a second bend and a third bend therein, each of the first, second and third bends each having generally a same angle such that said first elongated member extends downwardly from said covering to said first bend, extends downward and toward said first side wall to said second bend, downward along said first side wall to said third bend and from said third bend toward said second side wall and downward, said second end of said first elongated member being positioned adjacent to said slot and between said slot and said first side wall, a second elongated member being integrally attached to and extending upwardly from said second end of said first elongated member, a elongated member being integrally attached to and extending between a top end of said second elongated member and said upper end of the first arm such that said third elongated member is angled upwardly from said second elongated member to said first arm, wherein depressing of said actuator lifts said second elongated member such that the panel is moved toward said second side wall.

9. The device according to claim 8, further including a biasing arm being integrally attached to said first arm and extending toward and abutting said third elongated member, said biasing arm being angled upwardly such that said biasing arm and said third elongated member form an angle directed toward said first arm, said angle having a measurement greater than 90 degrees.

*10. An apparatus according to claim 1, wherein the actuating assembly comprises:*

(*a*) *a lifting plate positioned in the second compartment and positioned adjacent to the vertical slot;*

(*b*) *a lifting arm attached to the lifting plate; and*

(*c*) *an actuator integrally coupled to the lifting arm for selectively moving the lifting plate upwardly such that a cigarette positioned on the lifting plate is extended upwardly through the aperture, the actuator extending through the second side wall.*

*11. An apparatus according to claim 10, further comprising:*

(*a*) *a panel positioned between the top cover and the first dividing wall; and*

(*b*) *an opening arm attached to the panel for selectively moving the panel from a first position closing the aperture to a second position opening the aperture, the opening arm integrally coupled to the actuator whereby the opening arm moves the panel to the second position when the lifting arm moves the plate upwardly.*

*12. An apparatus for dispensing cigarettes comprising:*

(*a*) *a housing having a bottom wall, a front wall, a back wall, a first side wall, and a second side wall;*

(*b*) *a first dividing wall extending from proximate the first side wall to proximate the second side wall and defining a first compartment defined by the first dividing wall and the back wall, and a second compartment defined by the first dividing wall and the front wall; the first dividing wall having a substantially vertical slot therein extending upwardly from the bottom wall and into the first and second compartments, wherein the second compartment is adapted for containing a plurality of cigarettes;*

(*c*) *a top cover positioned on the housing and having an aperture therein communicating with the second compartment, wherein the top cover is removably attached to the housing and spaced apart from the first dividing wall;*

(*d*) *an actuating assembly positioned in the first compartment and extending into the second compartment through the substantially vertical slot for selectively lifting a cigarette contained in the second compartment upwardly through the aperture in the top cover; wherein the actuating assembly comprises:*

(*i*) *a lifting plate positioned in the second compartment and positioned adjacent to the vertical slot;*

(*ii*) *a lifting arm positioned in the first compartment, the lifting arm extending through the slot and being attached to the lifting plate;*

(*iii*) *an actuator integrally coupled to the lifting arm for selectively moving the lifting plate upwardly whereby a cigarette positioned on the lifting plate is extended upwardly through the aperture, the actuator extending through the second side wall;*

(*iv*) *a panel positioned between the top cover and the first dividing wall; and*

(*v*) *an opening arm attached to the panel for selectively moving the panel from a first position closing the aperture to a second position opening the aperture, the opening arm being integrally coupled to the actuator whereby the opening arm moves the panel to the second position when the lifting arm moves the plate upwardly.*

*13. An apparatus for dispensing cigarettes comprising:*

(*a*) *a housing having a bottom wall, a front wall, a back wall, a first side wall, and a second side wall;*

(*b*) *a first dividing wall extending from the first side wall to the second side wall and defining a first compartment defined by the first dividing wall and the back wall, and a second compartment defined by the first dividing wall and the front wall; the first dividing wall having a vertical slot therein extending upwardly from the bottom wall and into the first and second compartments, wherein the second compartment is adapted for containing a plurality of cigarettes;*

(*c*) *a top cover positioned on the housing and having an aperture therein communicating with the second compartment, wherein the top cover is removably attached to the housing and spaced apart from the first dividing wall;*

(*d*) *an actuating assembly positioned in the first compartment and extending into the second compartment through the vertical slot for selectively lifting a cigarette contained in the second compartment upwardly through the aperture in the top cover, wherein the actuating assembly comprises:*

(*i*) *a lifting plate positioned in the second compartment and positioned adjacent to the vertical slot;*

(*ii*) *a lifting arm positioned in the first compartment, the lifting arm extending through the slot and being attached to the lifting plate;*

(*iii*) *an actuator integrally coupled to the lifting arm for selectively moving the lifting plate upwardly whereby a cigarette positioned on the lifting plate is extended upwardly through the aperture, the actuator extending through the second side wall;*

(*iv*) *a panel positioned between the top cover and the first dividing wall; and*

(*v*) *an opening arm attached to the panel for selectively moving the panel from a first position closing the aperture to a second position opening the aperture, the opening arm being integrally coupled to the actuator whereby the opening arm moves the panel to the second position when the lifting arm moves the plate upwardly; and*

(*e*) *wherein the lifting arm includes a vertically orientated first arm having an upper end and a lower end, the upper end of the first arm is pivotally coupled to the first dividing wall and positioned adjacent to the second side wall, and further comprising:*

(*i*) *a horizontally orientated second arm having a first end and a second end, the first end of the second arm being pivotally attached to the first dividing wall and positioned adjacent to the lower end of the first arm;*

(*ii*) *a foot integrally attached to and extending downwardly and away from the first end of the second arm, the foot extending toward the second side wall, the second end of the second arm positioned adjacent to an upper end of the slot; and*

(*iii*) *a leg attached to the second end of the second arm and extending downwardly therefrom, a bottom end of the leg being integrally attached to the plate, the actuator extending through the second side wall and being attached to the first arm, wherein depressing the actuator urges the foot downward whereby the leg and the attached plate is lifted.*

*14. An apparatus according to claim 13, further comprising a substantially U-shaped biasing member having a first end attached to the first arm and a second end attached to the second arm, the biasing member biasing the second arm toward a horizontal position.*

*15. An apparatus according to claim 13, further comprising a second dividing wall extending between the first dividing wall and the front wall, wherein the second compartment comprises a first section defined by the first side wall and the second dividing wall for containing a cigarette lighter, and a second section defined by the second dividing wall and the second side wall for containing the plurality of cigarettes.*

*16. An apparatus according to claim 13, wherein the opening arm includes a first elongated member having a first end integrally attached to the panel, and a second end positioned adjacent to the bottom wall, the first elongated member having a first bend, a second bend and a third bend therein, each of the first, second and third bends having a similar angle whereby the first elongated member extends downwardly from the covering to the first bend, extends downward and toward the first side wall to the second bend, downward along the first side wall to the third bend and from the third bend toward the second side wall and downward, the second end of the first elongated member being positioned adjacent to the slot and between the slot and the first side wall, a second elongated member being integrally attached to and extending upwardly from the second end of the first elongated member, a elongated member being integrally attached to and extending between a top end of the second elongated member and the upper end of the first arm such that the third elongated member is angled upwardly from the second elongated member to the first arm, wherein depressing the actuator lifts the second elongated member whereby the panel is moved toward the second side wall.*

*17. An apparatus according to claim 16, further comprising a biasing arm integrally attached to the first arm, and extending toward and abutting the third elongated member, the biasing arm angled upwardly wherein the biasing arm and the third elongated member form an angle of greater than ninety degrees directed toward the first arm.*

*18. An apparatus for dispensing cigarettes comprising:*

(*a*) *a housing having a bottom wall, a front wall, a back wall, a first side wall, and a second side wall;*

(*b*) *a first dividing wall extending from proximate the first side wall to proximate the second side wall and defining a first compartment defined by the first dividing wall and the back wall, and a second compartment defined by the first dividing wall and the front wall; the first dividing wall having a substantially vertical slot therein extending upwardly from the bottom wall and into the first and second compartments, wherein the second compartment is adapted for containing a plurality of cigarettes;*

(*c*) *a top cover positioned on the housing and having an aperture therein communicating with the second compartment;*

(*d*) *an actuating assembly positioned in the first compartment and extending into the second compartment through the substantially vertical slot for selectively lifting a cigarette contained in the second compartment upwardly through the aperture in the top cover;*

(*e*) *a panel positioned below the top cover and above the second compartment; and*

(*f*) *an opening member operatively connected to the actuating assembly and attached to the panel for selectively sliding the panel from a first position closing the aperture to a second position opening the aperture.*

* * * * *